US012631540B2

(12) United States Patent
Liu et al.

(10) Patent No.: US 12,631,540 B2
(45) Date of Patent: May 19, 2026

(54) BOTTLE-MOUTH PACKAGE PERMEABILITY TEST SYSTEM

(71) Applicant: China Resources Snow Breweries Company Ltd, Beijing (CN)

(72) Inventors: Yueqin Liu, Beijing (CN); Lidong He, Beijing (CN); Tao Wang, Beijing (CN); Bo Zheng, Beijing (CN); Ting Wang, Beijing (CN); Biao Jin, Beijing (CN); Junhui Zhong, Beijing (CN); Zhi Li, Beijing (CN); Zhihao Li, Beijing (CN)

(73) Assignee: CHINA RESOURCES SNOW BREWERIES COMPANY LTD, Beijing (CN)

( * ) Notice: Subject to any disclaimer, the term of this patent is extended or adjusted under 35 U.S.C. 154(b) by 328 days.

(21) Appl. No.: 18/494,364

(22) Filed: Oct. 25, 2023

(65) Prior Publication Data

US 2024/0337578 A1 Oct. 10, 2024

(30) Foreign Application Priority Data

Apr. 4, 2023 (CN) .......................... 202310348472.5

(51) Int. Cl.
G01N 15/08 (2006.01)
G01N 1/42 (2006.01)
G01N 1/44 (2006.01)

(52) U.S. Cl.
CPC .......... G01N 15/0826 (2013.01); G01N 1/42 (2013.01); G01N 1/44 (2013.01); G01N 15/08 (2013.01); G01N 15/0806 (2013.01)

(58) Field of Classification Search
CPC ........ G01N 15/0826; G01N 1/42; G01N 1/44; G01N 15/08; G01N 15/0806
See application file for complete search history.

(56) References Cited

U.S. PATENT DOCUMENTS 6,857,307 B2 * 2/2005 Gebele ................ G01M 3/3281
73/49.3
2004/0040372 A1 * 3/2004 Plester ............... G01N 15/0826
73/38
2009/0282900 A1 11/2009 Piombini et al.

FOREIGN PATENT DOCUMENTS

CN 101175983 A 5/2008
JP 2018077187 A 5/2018

OTHER PUBLICATIONS

First Office Action issued for Chinese Patent Application No. 202310348472.5, dated Dec. 30, 2025, 9 pages including English machine translation.

* cited by examiner

*Primary Examiner* — Benjamin R Schmitt
(74) *Attorney, Agent, or Firm* — HSML P.C.

(57) ABSTRACT

A bottle-mouth package permeability test system includes: a bottle-mouth mold group, a permeation amplifying cavity, a carrier gas assembly, a to-be-tested gas assembly, a pressure regulating assembly, a temperature regulating assembly, and a detection assembly. The carrier gas assembly allows a carrier gas to circulate in the bottle-mouth mold group connected in series on the carrier gas assembly. The to-be-tested gas assembly allows a to-be-tested gas to flow in the permeation amplifying cavity connected in series on the to-be-tested gas assembly. The pressure regulating assembly can regulate pressure states of the carrier gas outputted by the carrier gas assembly and the to-be-tested gas outputted by the to-be-tested gas assembly. The temperature regulating assembly can regulate temperature states of the carrier gas and the to-be-tested gas. The detection assembly is in communication with an exhaust end of the carrier gas assembly.

10 Claims, 4 Drawing Sheets

201

101

201

101

BOTTLE-MOUTH PACKAGE PERMEABILITY TEST SYSTEM

CROSS-REFERENCE TO RELATED APPLICATIONS

This application claims priority to Chinese patent application No. 2023103484725, filed on Apr. 4, 2023, the entire content of which is incorporated herein by reference in its entirety.

TECHNICAL FIELD

The present disclosure relates to the field of packaging inspection technologies, and in particular, to a bottle-mouth package permeability test system.

BACKGROUND

With the rapid development of packaging technologies, packaging forms are becoming more and more complex, and people have higher and higher requirements for sealing performance of packaging. The industry has developed a variety of package permeability detection or test devices based on a Coulometric method, which is mainly limited to detection of thin films, plastic bottles, and metal packaging containers. For packages such as glass bottles and ceramic bottles that are fragile or have a large impact on results by use of destructive testing, there is no reliable test device for auxiliary detection and evaluation.

At present, due to pressure inside packaging of beer glass bottles or carbonated beverages, the test method of destructive puncture from a bottle mouth interferes with internal stability of the packaging during the puncturing. At the same time, damages to a bottle cap affect stress distribution of the bottle cap, which further interferes with test results of sealing performance of the package, resulting in a large deviation of the results. In addition, most foods or medicines are extremely sensitive to oxygen or water vapor, and permeation of ppb-level oxygen or water vapor per day may also cause irreversible damages to quality of a product during a shelf life. For the conventional Coulometric instrument, a detection limit can hardly reach this level. Based on a current permeability detection method, it is also difficult to evaluate bottle-mouth packages with better sealing performance.

SUMMARY

Accordingly, it is necessary to provide a bottle-mouth package permeability test system to address the problem of how to control a permeation amplification effect of bottle-mouth packages.

A bottle-mouth package permeability test system includes:

a permeation amplifying cavity, a bottle-mouth mold group being sealed and mounted in the permeation amplifying cavity; wherein the bottle-mouth mold group includes a plurality of bottle-mouth molds connected in series;

a carrier gas assembly connected to the bottle-mouth mold group;

a to-be-tested gas assembly connected to the permeation amplifying cavity; an intake end of the to-be-tested gas assembly being arranged adjacent to an exhaust end of the carrier gas assembly, and an exhaust end of the to-be-tested gas assembly being arranged adjacent to an intake end of the carrier gas assembly;

a pressure regulating assembly configured to regulate pressure states of a carrier gas outputted by the carrier gas assembly and a to-be-tested gas outputted by the to-be-tested gas assembly;

a temperature regulating assembly configured to regulate temperature states of the carrier gas outputted by the carrier gas assembly and the to-be-tested gas outputted by the to-be-tested gas assembly; and a detection assembly in communication with the exhaust end of the carrier gas assembly.

In an embodiment, the system further includes a purification device mounted between the carrier gas assembly and the bottle-mouth mold group.

In an embodiment, the system further includes:

a protection cavity covering the permeation amplifying cavity, gas pressure in the permeation amplifying cavity, gas pressure in the protection cavity, and atmospheric pressure being configured in a sequentially decreasing gradient;

a protection cavity intake passage and a protection cavity exhaust passage that are in communication with the protection cavity respectively;

a protection cavity regulating valve mounted on the protection cavity intake passage and the protection cavity exhaust passage respectively;

a protection cavity first sensing member configured to acquire gas pressure in the protection cavity, the protection cavity first sensing member being mounted on the protection cavity exhaust passage; and a protection cavity second sensing member configured to acquire a gas temperature in the protection cavity, the protection cavity second sensing member being mounted in the protection cavity.

In an embodiment, the system further includes a protection cavity heater and a protection cavity refrigerator that are mounted in the protection cavity.

In an embodiment, the system further includes a drying device configured to dry the carrier gas fed into the bottle-mouth mold group and the to-be-tested gas fed into the permeation amplifying cavity, respectively.

In an embodiment, the carrier gas assembly includes:

a carrier gas intake passage, a first end of the carrier gas intake passage being configured to feed the carrier gas, and a second end of the carrier gas intake passage being connected to an intake end of the bottle-mouth mold group;

a carrier gas exhaust passage, a first end of the carrier gas exhaust passage being connected to an exhaust end of the bottle-mouth mold group, and a second end of the carrier gas exhaust passage being connected to the detection assembly;

a first regulating valve mounted on the carrier gas intake passage and the carrier gas exhaust passage respectively; and a first pressure-relief valve mounted on the carrier gas intake passage.

In an embodiment, the to-be-tested gas assembly includes:

a to-be-tested gas intake passage, a first end of the to-be-tested gas intake passage being configured to feed the to-be-tested gas, and a second end of the to-be-tested gas intake passage being connected to an intake port of the permeation amplifying cavity, wherein the intake port is arranged at a position in the permeation amplifying cavity adjacent to an exhaust end of the carrier gas assembly;

a to-be-tested gas exhaust passage connected to an exhaust port of the permeation amplifying cavity, wherein the exhaust port is arranged at a position in the permeation amplifying cavity adjacent to an intake end of the carrier gas assembly;

a second regulating valve mounted on the to-be-tested gas intake passage; and a second pressure-relief valve mounted on the to-be-tested gas intake passage.

In an embodiment, the pressure regulating assembly includes:

a carrier gas path exhaust valve mounted on the carrier gas intake passage;

a carrier gas path first sensing member configured to acquire gas pressure in the carrier gas intake passage and the carrier gas exhaust passage;

a to-be-tested gas path exhaust valve mounted on the to-be-tested gas intake passage; and a to-be-tested gas path first sensing member configured to acquire gas pressure in the to-be-tested gas intake passage and the to-be-tested gas exhaust passage.

In an embodiment, the temperature regulating assembly includes:

a heat exchange assembly configured to respectively heat the carrier gas fed into the bottle-mouth mold group and the to-be-tested gas fed into the permeation amplifying cavity and to refrigerate a carrier gas discharged from the bottle-mouth mold group; or the heat exchange assembly being configured to respectively refrigerate the carrier gas fed into the bottle-mouth mold group and the to-be-tested gas fed into the permeation amplifying cavity and to heat a carrier gas discharged from the bottle-mouth mold group;

a carrier gas path second sensing member configured to acquire gas temperatures in the carrier gas intake passage and the carrier gas exhaust passage; and a to-be-tested gas path second sensing member configured to acquire temperatures in the to-be-tested gas intake passage and the to-be-tested gas exhaust passage.

In an embodiment, the heat exchange assembly includes:

a first heat exchanger mounted on the carrier gas intake passage;

a second heat exchanger mounted on the carrier gas exhaust passage; and a third heat exchanger mounted on the to-be-tested gas intake passage;

when the first heat exchanger is configured to heat the carrier gas fed into the bottle-mouth mold group, the second heat exchanger is configured to refrigerate the carrier gas discharged from the bottle-mouth mold group; or when the first heat exchanger is configured to refrigerate the carrier gas fed into the bottle-mouth mold group, the second heat exchanger is configured to heat the carrier gas discharged from the bottle-mouth mold group.

According to the present disclosure, the permeation amplification effect of the bottle-mouth packages is controlled by adjusting a number of series connections between bottle-mouth molds in the bottle-mouth mold group and in cooperation with pressure and temperature regulation, which provides a better solution for permeability tests of the bottle-mouth packages.

REFERENCE SIGNS

Figure 1:
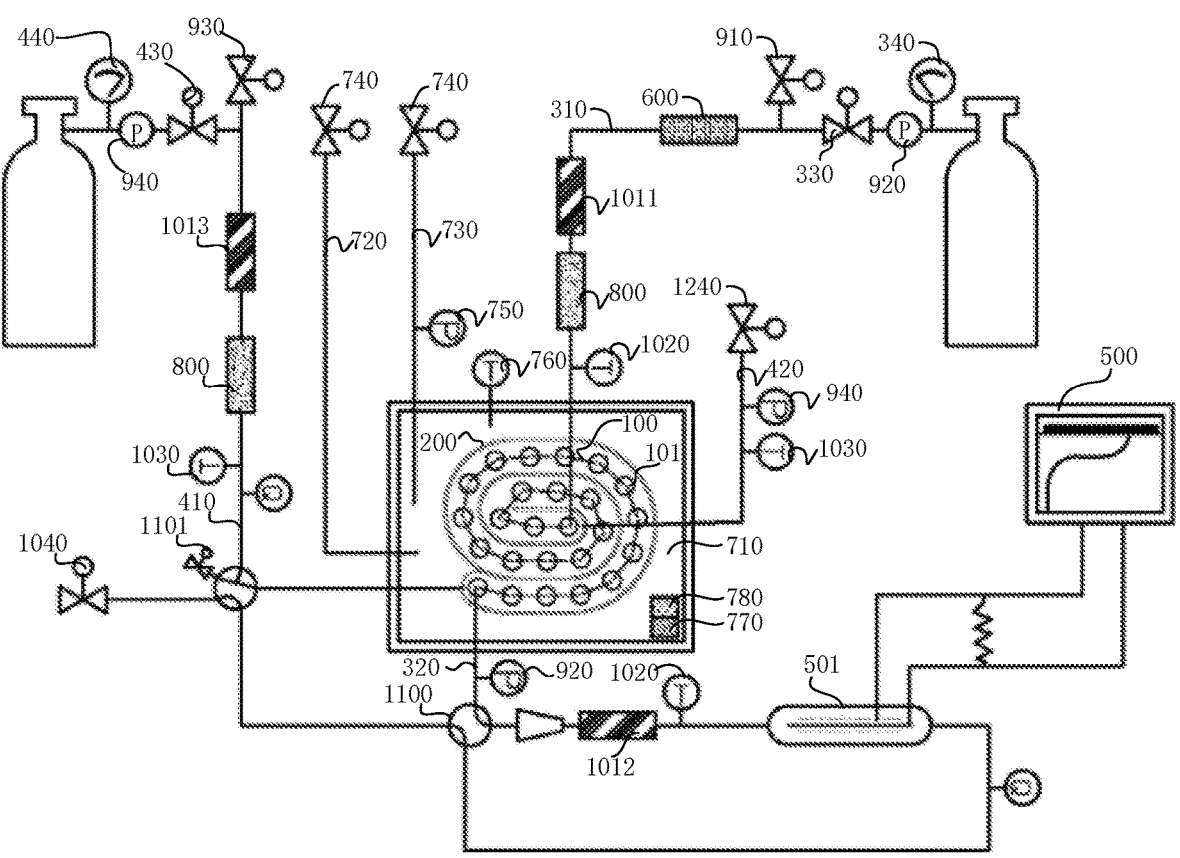
FIG. 1 is a schematic structural view of a bottle-mouth package permeability test system according to an embodiment of the present disclosure.

100: bottle-mouth mold group;
101: bottle-mouth mold;
200: permeation amplifying cavity;
201: to-be-tested flow channel;
310: carrier gas intake passage;
320: carrier gas exhaust passage;
330: first regulating valve;
340: first pressure-relief valve;
410: to-be-tested gas intake passage;
420: to-be-tested gas exhaust passage;
430: second regulating valve;
440: second pressure-relief valve;
500: detection assembly;
501: sensor;
600: purification device;
710: protection cavity;
720: protection cavity intake passage;
730: protection cavity exhaust passage;
740: protection cavity regulating valve;
750: protection cavity first sensing member;
760: protection cavity second sensing member;
770: protection cavity heater;
780: protection cavity refrigerator;
800: drying device;
910: carrier gas path exhaust valve;
920: carrier gas path first sensing member;
930: to-be-tested gas path exhaust valve;
940: to-be-tested gas path first sensing member;
1011: first heat exchanger;
1012: second heat exchanger;
1013: third heat exchanger;
1020: carrier gas path second sensing member;
1030: to-be-tested gas path second sensing member;
1040: carrier gas path exhaust regulating valve;
1101: to-be-tested gas path two-position five-way valve;
1100: carrier gas path two-position four-way valve;
1240: to-be-tested gas path exhaust regulating valve.

DETAILED DESCRIPTION OF THE EMBODIMENTS

In order to make the above objectives, features and advantages of the present disclosure more obvious and understandable, specific implementations of the present disclosure are described in detail below with reference to the accompanying drawings. In the following description, many specific details are set forth in order to fully understand the present disclosure. However, the present disclosure can be implemented in many other ways different from those described herein, and those skilled in the art can make similar improvements without departing from the connotation of the present disclosure. Therefore, the present disclosure is not limited by specific embodiments disclosed below.

In the description of the present disclosure, it should be understood that the orientation or position relationships indicated by the terms "central", "longitudinal", "transverse", "length", "width", "thickness", "up", "down", "front", "back", "left", "right", "vertical", "horizontal", "top", "bottom", "inner", "outer", "clockwise", "counterclockwise", "axial", "radial", "circumferential", etc. are based on the orientation or position relationships shown in the accompanying drawings and are intended to facilitate the description of the present disclosure and simplify the description only, rather than indicating or implying that the apparatus or element referred to must have a particular orientation or be constructed and operated in a particular orientation, and therefore are not to be interpreted as limiting the present disclosure.

In addition, the terms "first" and "second" are used for descriptive purposes only, which cannot be construed as indicating or implying a relative importance or implicitly specifying the number of the indicated technical features. Thus, the features defined with "first" and "second" may explicitly or implicitly include at least one feature. In the description of the present disclosure, "a plurality of" means at least two, such as two or three, unless specifically stated otherwise.

In the present disclosure, unless otherwise specifically stated and limited, the terms "install," "join," "connect", "fix", etc. should be understood in a broad sense, such as, a fixed connection, a detachable connection, or an integral connection; a mechanical connection, or an electrical connection; a direct connection, an indirect connection through an intermediate medium, internal communication between two elements, or interaction between two elements, unless otherwise expressly defined. For those of ordinary skill in the art, the specific meanings of the foregoing terms in the present invention can be understood on a case-by-case basis.

In the present disclosure, unless otherwise explicitly specified and defined, a first feature being "on" or "under" a second feature may be a case that the first feature is in direct contact with the second feature, or the first feature is in indirect contact with the second feature via an intermediate medium. Furthermore, the first feature being "over", "above" and "on top of" the second feature may be a case that the first feature is directly above or obliquely above the second feature, or only means that the level of the first feature is higher than that of the second feature. The first feature being "below", "underneath" or "under" the second feature may be a case that the first feature is directly underneath or obliquely underneath the second feature, or only means that the level of the first feature is lower than that of the second feature.

It should be noted that when one element is referred to as "fixed to" or "arranged on" another element, it may be directly disposed on the another element or an intermediate element may exist. When one element is considered to be "connected to" another element, it may be directly connected to the another element or an intermediate element may co-exist. The terms "vertical", "horizontal", "up", "down", "left", "right" and similar expressions used herein are for illustrative purposes only, and do not represent unique embodiments.

Figure 2:
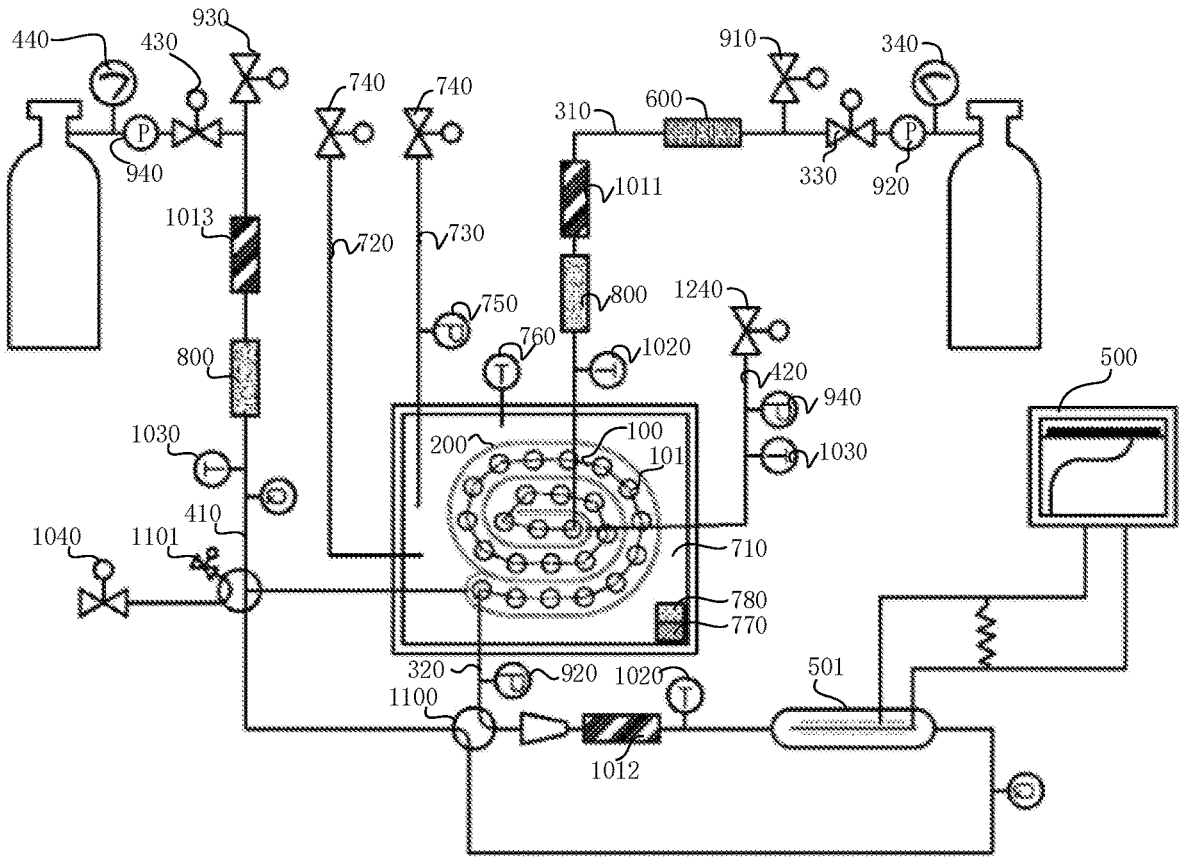
FIG. 2 is a schematic view of purging of a to-be-tested gas path in the bottle-mouth package permeability test system according to an embodiment of the present disclosure.

Referring to FIG. 1 to FIG. 3, FIG. 1 is a schematic structural view of a bottle-mouth package permeability test system according to an embodiment of the present disclosure, FIG. 2 is a schematic view of purging of a to-be-tested gas path in the bottle-mouth package permeability test system according to an embodiment of the present disclosure, and FIG. 3a to FIG. 3d are schematic views of shapes of a permeable medium flow channel according to an embodiment of the present disclosure.

In an embodiment of the present disclosure, a bottle-mouth package permeability test system is provided, including: a bottle-mouth mold group 100, a permeation amplifying cavity 200, a carrier gas assembly, a to-be-tested gas assembly, a pressure regulating assembly, a temperature regulating assembly, and a detection assembly 500. The bottle-mouth mold group 100 is sealed and mounted in the permeation amplifying cavity 200. The bottle-mouth mold group 100 includes a plurality of bottle-mouth molds 101 connected in series. The carrier gas assembly enables a carrier gas to circulate in the bottle-mouth mold group 100 connected in series on the carrier gas assembly. The to-be-tested gas assembly enables a to-be-tested gas to flow in the permeation amplifying cavity 200 connected in series on the to-be-tested gas assembly. An intake end of the to-be-tested gas assembly is arranged adjacent to an exhaust end of the carrier gas assembly, and the exhaust end of the to-be-tested gas assembly is arranged adjacent to an intake end of the carrier gas assembly. The pressure regulating assembly is configured to regulate pressure states of a carrier gas outputted by the carrier gas assembly and a to-be-tested gas outputted by the to-be-tested gas assembly. The temperature regulating assembly is configured to regulate temperature states of the carrier gas outputted by the carrier gas assembly and the to-be-tested gas outputted by the to-be-tested gas assembly. The detection assembly 500 is in communication with the exhaust end of the carrier gas assembly.

According to the present disclosure, the bottle-mouth mold group 100 is arranged on a series gas path, which can achieve an effect of amplifying permeation without damaging the packages and can also adjust a permeation amplification effect of bottle-mouth packages by adjusting a number of series connections between bottle-mouth molds 101 in the bottle-mouth mold group 100. At the same time, the pressure regulating assembly and the temperature regulating assembly arranged flexibly adjust permeation efficiency by adjusting temperatures and pressure of the carrier gas outputted by the carrier gas assembly and the to-be-tested gas outputted by the to-be-tested gas assembly. According to the present disclosure, by improving the permeation amplification effect and the permeation efficiency, the test accuracy is improved when Coulometric detection assemblies with same precision are used.

In an embodiment of the present disclosure, the system further includes a purification device 600. The purification device 600 is mounted between the carrier gas assembly and the bottle-mouth mold group 100. In this embodiment, the purification device 600 is provided to purify the carrier gas to be fed into the bottle-mouth mold group 100, which is conductive to accuracy of test results.

In an embodiment of the present disclosure, the system further includes: a protection cavity 710, a protection cavity intake passage 720, a protection cavity exhaust passage 730, two protection cavity regulating valves 740, a protection cavity first sensing member 750, and a protection cavity second sensing member 760.

The protection cavity 710 covers the permeation amplifying cavity 200. The protection cavity intake passage 720 and the protection cavity exhaust passage 730 are in communication with the protection cavity 710, respectively. The two protection cavity regulating valves 740 are mounted on the protection cavity intake passage 720 and the protection cavity exhaust passage 730, respectively and configured to control gas path flow rates of the protection cavity intake passage 720 and the protection cavity exhaust passage 730.

The protection cavity first sensing member 750 is mounted on the protection cavity exhaust passage 730 and configured to acquire gas pressure in the protection cavity 710. The protection cavity second sensing member 760 is mounted in the protection cavity 710 and configured to acquire a gas temperature in the protection cavity 710.

In this embodiment, the protection cavity regulating valve 740 cooperates with the protection cavity first sensing member 750 to adjust the pressure in the protection cavity 710, so that gas pressure in the permeation amplifying cavity 200, gas pressure in the protection cavity 710, and atmospheric pressure are configured in a sequentially decreasing gradient, thereby reducing a requirement for structural strength of a gas path in the to-be-tested gas assembly. In addition, different pressure oscillation test conditions may also be provided by adjusting the pressure in the protection cavity 710, which is beneficial to extend a scope of application of the test system.

Further, the system further includes: a protection cavity heater 770 and a protection cavity refrigerator 780 that are mounted in the protection cavity 710. The protection cavity heater 770 and the protection cavity refrigerator 780 are configured to regulate a temperature in the protection cavity 710. Optionally, when the gas temperature in the protection cavity 710 acquired by the second sensing member is lower than a preset temperature, the protection cavity heater 770 is turned on to increase the temperature in the protection cavity 710. When the temperature in the protection cavity 710 reaches the preset temperature, the protection cavity heater 770 is turned off. Further optionally, when the gas temperature in the protection cavity 710 acquired by the second sensing member is higher than the preset temperature, the protection cavity refrigerator 780 is turned on to decrease the temperature in the protection cavity 710. When the temperature in the protection cavity 710 reaches the preset temperature, the protection cavity refrigerator 780 is turned off. Optionally, in order to make distribution in the protection cavity 710 more uniform, a heat transfer fan may also be arranged in the protection cavity 710.

Figure 3A:
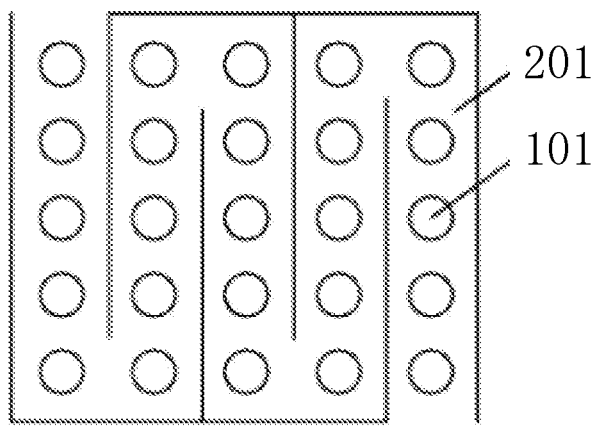
FIG. 3a to FIG. 3d are schematic views of shapes of a permeable medium flow channel according to an embodiment of the present disclosure.
Figure 3B:
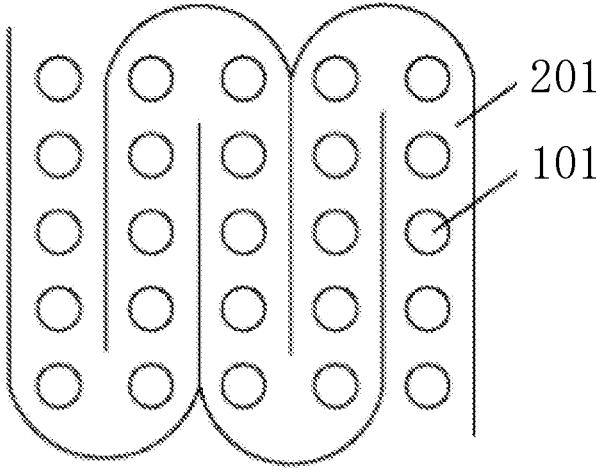
Figure 3C:
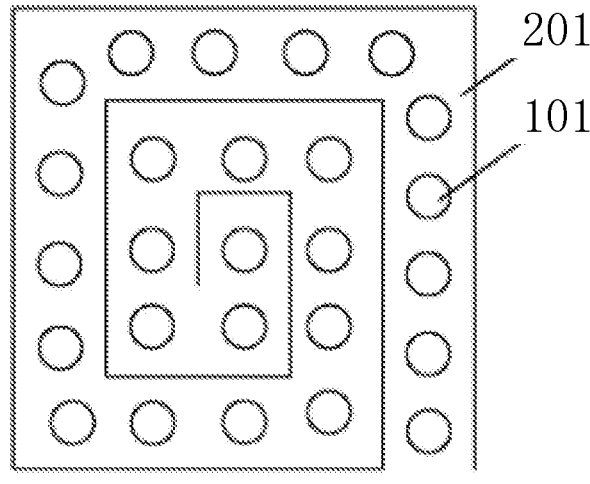
Figure 3D:
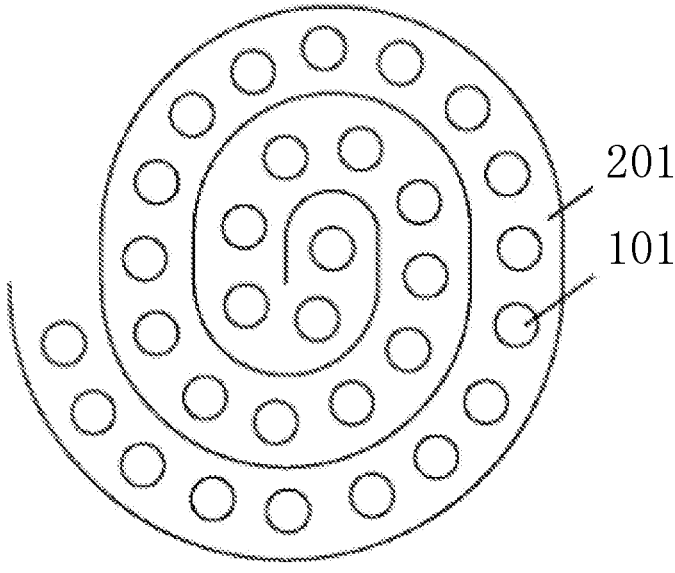

In an embodiment of the present disclosure, a to-be-tested flow channel 201 is provided inside the permeation amplifying cavity 200, so as to guide a permeable medium fed into the permeation amplifying cavity 200. In this case, the bottle-mouth molds 101 in the bottle-mouth mold group 100 are sequentially arranged along the to-be-tested gas flow channel 201, so that each bottle-mouth mold 101 in the bottle-mouth mold group 100 is in an atmosphere of the permeable medium. A U-shaped to-be-tested gas flow channel 201 (as shown in FIG. 3a), an S-shaped to-be-tested gas flow channel 201 (as shown in FIG. 3b), a circular and S-shaped to-be-tested gas flow channel 201 (as shown in FIG. 3c), a spiral to-be-tested gas flow channel 201 (as shown in FIG. 3d), or the like may be selected as the to-be-tested gas flow channel. Other shapes of the flow channel that can be known by those skilled in the art may also be selected, which is not specifically limited herein.

In an embodiment of the present disclosure, the system further includes a drying device 800. The drying device 800 is configured to dry the carrier gas fed into the bottle-mouth mold group 100 and the to-be-tested gas fed into the permeation amplifying cavity 200 respectively.

The carrier gas assembly specifically includes: a carrier gas intake passage 310, a carrier gas exhaust passage 320, a first regulating valve 330, and a first pressure-relief valve 340. A first end of the carrier gas intake passage 310 is connected to a carrier gas cylinder, the carrier gas is fed into the carrier gas intake passage 310, a second end of the carrier gas intake passage 310 is in communication with the bottle-mouth mold 101 on an end portion of the bottle-mouth mold group 100, and the carrier gas sequentially passes through the bottle-mouth mold 101 in the bottle-mouth mold group 100, until the carrier gas flows to the bottle mouth mold 101 on the other end portion of the bottle-mouth mold group 100 and is outputted from a first end of the carrier gas exhaust passage 320 to the exterior of the bottle-mouth mold group 100. At the same time, a second end of the carrier gas exhaust passage 320 is connected to the detection assembly 500, and oxygen, air, and the like remaining in the carrier gas exhaust passage 320 after passing through the bottle-mouth mold group 100 are detected through the detection assembly 500. The first regulating valve 330 and the first pressure-relief valve 340 are mounted on the carrier gas intake passage 310. The first regulating valve 330 is mounted on the carrier gas exhaust passage 320, so as to ensure that the carrier gas entering the bottle-mouth mold group 100 has a stable flow rate and pressure.

The to-be-tested gas assembly includes: a to-be-tested gas intake passage 410, a to-be-tested gas exhaust passage 420, a second regulating valve 430, and a second pressure-relief valve 440.

A first end of the to-be-tested gas intake passage 410 is connected to a carrier gas cylinder of a to-be-tested gas, and the to-be-tested gas is fed into the to-be-tested gas intake passage 410. A second end of the to-be-tested gas intake passage 410 is connected to an intake port of the permeation amplifying cavity 200, and the to-be-tested gas is fed into the permeation amplifying cavity 200. It should to be noted that, the intake port is arranged at a position in the permeation amplifying cavity 200 adjacent to an exhaust end of the carrier gas assembly, and the exhaust port is arranged at a position in the permeation amplifying cavity 200 adjacent to an intake end of the carrier gas assembly. The to-be-tested gas is discharged from the permeation amplifying cavity 200 through the to-be-tested gas exhaust passage 420 connected to the exhaust port of the permeation amplifying cavity 200. A second regulating valve 430 and a second pressure-relief valve 440 are mounted on the to-be-tested gas intake passage 410. The to-be-tested gas path exhaust regulating valve 1240 is mounted on the to-be-tested gas exhaust passage 420, thus ensuring that the to-be-tested gas entering the permeation amplifying cavity 200 has a stable flow rate and pressure.

The pressure regulating assembly specifically includes: a carrier gas path exhaust valve 910, a carrier gas path first sensing member 920, a to-be-tested gas path exhaust valve 930, and a to-be-tested gas path first sensing member 940. The carrier gas path exhaust valve 910 is mounted on the carrier gas intake passage 310. The carrier gas path first sensing member 920 is configured to acquire gas pressure in the carrier gas intake passage 310 and the carrier gas exhaust passage 320. The to-be-tested gas path exhaust valve 930 is mounted on the to-be-tested gas intake passage 410. The to-be-tested gas path first sensing member 940 is configured to acquire gas pressure in the to-be-tested gas intake passage 410 and the to-be-tested gas exhaust passage 420.

The temperature regulating assembly specifically includes: a heat exchange assembly, a carrier gas path second sensing member 1020, and a to-be-tested gas path second sensing member 1030. The heat exchange assembly is configured to heat the carrier gas fed into the bottle-mouth mold group 100 and the to-be-tested gas fed into the permeation amplifying cavity 200, and to refrigerate a carrier gas discharged from the bottle-mouth mold group 100. Alternatively, the heat exchange assembly is configured to refrigerate the carrier gas fed into the bottle-mouth mold group 100 and the to-be-tested gas fed into the permeation amplifying cavity 200, and to heat carrier gas discharged from the bottle-mouth mold group 100. The carrier gas path second sensing member 1020 is configured to acquire gas temperatures in the carrier gas intake passage 310 and the carrier gas exhaust passage 320. The to-be-tested gas path second sensing member 1030 is configured to acquire temperatures in the to-be-tested gas intake passage 410 and the to-be-tested gas exhaust passage 420.

Further, the heat exchange assembly includes: a first heat exchanger 1011, a second heat exchanger 1012, and a third heat exchanger 1013. The first heat exchanger 1011 is mounted on the carrier gas intake passage 310. The second heat exchanger 1012 is mounted on the carrier gas exhaust passage 320. The third heat exchanger 1013 is mounted on the to-be-tested gas intake passage 410.

In an optional embodiment, when the first heat exchange member 1011 heats the carrier gas fed into the bottle-mouth mold group 100, the second heat exchanger 1012 refrigerates the carrier gas discharged from the bottle-mouth mold group 100. In this case, the third heat exchanger 1013 generally also heats the to-be-tested gas fed into the permeation amplifying cavity 200.

In another optional embodiment, when the first heat exchange member 1011 refrigerates the carrier gas fed into the bottle-mouth mold group 100, the second heat exchanger 1012 heats the carrier gas discharged from the bottle-mouth mold group 100. In this case, the third heat exchanger 1013 generally also refrigerates the to-be-tested gas fed into the permeation amplifying cavity 200.

A control method for a bottle-mouth package permeability test system according to an embodiment of the present disclosure includes a purging step, a permeation execution step, and an unloading step.

The purging step includes: a system reset substep, a carrier gas path purging substep, and a to-be-tested gas path purging substep.

In the system reset substep, a temperature, pressure, and flow data of each sensor are acquired, the reset is successful if the data meet the requirement, and a program proceeds to the carrier gas path purging substep.

When the carrier gas path purging substep is performed, a carrier gas path two-position four-way valve 1100 is located at a first position (as shown in FIG. 1), and the carrier gas may pass through the carrier gas intake passage 310, the bottle-mouth mold group 100, the carrier gas exhaust passage 320, a first end of the carrier gas path two-position four-way valve 1100, a sensor 501 of the detection assembly 500, and a second end of the carrier gas path two-position four-way valve 1100, and then is discharged from the carrier gas path exhaust regulating valve 1040 and purged to reach a set sensor output value to complete the judgment of the substep. The program proceeds to the to-be-tested gas path purging substep.

In a specific embodiment, a flow rate of the carrier gas path may be set to 40 ml/min, a temperature of the carrier gas path may be set to 40° C., and pressure of the carrier gas path may be set to 0 MPa. The output value of the sensor 501, which tends to be constant, obtained after the carrier gas path purging substep may reflect air tightness of the carrier gas path of the bottle-mouth package permeability test system to some extent. The set values cannot be reached when the air tightness is not good. In this case, air tightness of structural parts on the carrier gas path of the bottle-mouth packaging permeability test system may be checked.

When the to-be-tested gas path purging substep is performed, a to-be-tested gas path two-position five-way valve 1101 is located at a second position (as shown in FIG. 2), a to-be-tested gas path exhaust regulating valve 1240 is turned off according to set time, and the carrier gas may pass through the carrier gas intake passage 310, the bottle-mouth mold group 100, the carrier gas exhaust passage 320, the first end of the carrier gas path two-position four-way valve 1100, the sensor 501 of the detection assembly 500, the second end of the carrier gas path two-position four-way valve 1100, the to-be-tested gas path two-position five-way valve 1101, and the to-be-tested gas intake passage 410, and then be purged and discharged through the to-be-tested gas path exhaust valve 930. The to-be-tested gas path exhaust regulating valve 1240 is on after a set closing time is reached. In this case, the to-be-tested gas path exhaust valve 930 is turned off, and the carrier gas may pass through interior of the permeation amplifying cavity 200 and exterior of the bottle-mouth mold group 100, pass through the to-be-tested gas exhaust passage 420, and is finally discharged through the to-be-tested gas path exhaust regulating valve 1240, and the substep is completed until the purging reaches output values set by the carrier gas path first sensing member 920 (carrier gas path pressure sensing member), the to-be-tested gas path first sensing member 940 (to-be-tested gas path pressure sensing member), the carrier gas path second sensing member 1020 (carrier gas path temperature sensing member), the to-be-tested gas path second sensing member 1030 (to-be-tested gas path temperature sensing member), the protection cavity first sensing member 750 (protection cavity pressure sensing member), and the protection cavity second sensing member 760 (protection cavity temperature sensing member). The program jumps to the permeation execution step.

In a specific embodiment, the flow rate of the carrier gas may be set to 60 ml/min, the temperature of the carrier gas path may be set to 40° C., and the pressure of the carrier gas path may be set to 0 MPa. The output value of the sensor 501, which tends to be constant and lower than that in the carrier gas path purging substep, obtained after the to-be-tested gas path purging substep may further reflect the air tightness of the to-be-tested gas path and a rear section of the carrier gas path. When the air tightness is not good, the output values set by the carrier gas path first sensing member 920 (carrier gas path pressure sensing member), the to-be-tested gas path first sensing member 940 (to-be-tested gas path pressure sensing member), the carrier gas path second sensing member 1020 (carrier gas path temperature sensing member), the to-be-tested gas path second sensing member 1030 (to-be-tested gas path temperature sensing member), the protection cavity first sensing member 750 (protection cavity pressure sensing member), and the protection cavity second sensing member 760 (protection cavity temperature sensing member) cannot be reached. In this case, air tightness of structural parts on the to-be-tested gas path and the rear section of the carrier gas path of the bottle-mouth package permeability test system can be checked.

The permeation execution step includes: a to-be-tested gas replacement substep, a permeation test substep, and a test determination substep.

When the to-be-tested gas replacement substep is performed, the to-be-tested gas path two-position five-way valve 1101 is located at a first position (as shown in FIG. 1), the to-be-tested gas passes through the to-be-tested gas intake passage 410, the interior of the permeation amplifying cavity 200, and the exterior of the bottle-mouth mold group 100, passes through the to-be-tested gas exhaust passage 420, and finally is discharged through the to-be-tested gas path exhaust regulating valve 1240. When a signal of the sensor 501 of the detection assembly 500 rises to tend to be constant and the to-be-tested gas path second sensing member 1030 on the to-be-tested gas exhaust passage 420 reaches the output values set by the carrier gas path first sensing member 920 (carrier gas path pressure sensing member), the to-be-tested gas path first sensing member 940 (to-be-tested gas path pressure sensing member), the carrier gas path second sensing member 1020 (carrier gas path temperature sensing member), the to-be-tested gas path second sensing member 1030 (to-be-tested gas path temperature sensing member), the protection cavity first sensing member 750 (protection cavity pressure sensing member), and the protection cavity second sensing member 760 (protection cavity temperature sensing member), the to-be-tested gas replacement substep ends, and the program proceeds to the permeation test substep.

In a specific embodiment, a flow rate of the to-be-tested gas path may be set to 60 ml/min, the temperature of the carrier gas path may be set to 40° C., and the pressure of the carrier gas path may be set to 0 MPa.

When the permeation test substep is performed, in a first stage, the carrier gas exhaust regulating valve 1040 and the to-be-tested gas path exhaust regulating valve 1240 remain off. At the same time, the protection cavity regulating valve 740 is turned on. When the to-be-tested gas path, the carrier gas path, and the protection cavity first sensing member 750 reach set pressure, the protection cavity regulating valve 740 is turned off, the first regulating valve 330 and the carrier gas exhaust regulating valve 1040 perform regulation synchronously to maintain the flow rate and the pressure of the carrier gas path to the set values. The second regulating valve 430 and the to-be-tested gas path exhaust regulating valve 1240 perform regulation to maintain the flow rate and the pressure of the to-be-tested gas path to the set values. At the same time, the first heat exchanger 1011, the second heat exchanger 1012, and the third heat exchanger 1013 respectively maintain set temperatures of the carrier gas intake passage 310, the carrier gas exhaust passage 320, the to-be-tested gas intake passage 410, and the to-be-tested gas exhaust passage 420. When the carrier gas path first sensing member 920 (carrier gas path pressure sensing member), the to-be-tested gas path first sensing member 940 (to-be-tested gas path pressure sensing member), the carrier gas path second sensing member 1020 (carrier gas path temperature sensing member), the to-be-tested gas path second sensing member 1030 (to-be-tested gas path temperature sensing member), the protection cavity first sensing member 750 (protection cavity pressure sensing member), and the protection cavity second sensing member 760 (protection cavity temperature sensing member) all reach the set values, the permeation test substep ends, and the program proceeds to the test determination substep. In a specific embodiment, the flow rate of the carrier gas path may be set to 10 ml/min, the temperature of the carrier gas path may be set to 40° C., and the pressure of the carrier gas path may be set to 0.09 MPa. The flow rate of the carrier gas path may be set to 20 ml/min, the temperature of the carrier gas path may be set to 40° C., and the pressure of the carrier gas path may be set to 0.05 MPa. Pressure in the protection cavity first sensing member 750 may be set to 0.02 MPa.

The test determination substep includes a standard detection mode, a constant-temperature constant-pressure mode, a conditional oscillation mode, a self-calibration mode, and multiple custom modes. When the program runs and completes the set detection steps and the signal of the sensor 501 of the detection assembly 500 tends to be constant, the test determination substep ends, and the program jumps to the unloading step.

The unloading step includes: a pressure unloading substep, a temperature unloading substep, and a standby substep.

When the pressure unloading substep is performed, firstly, the first heat exchanger 1011, the second heat exchanger 1012, and the third heat exchanger 1013 stop operating. Secondly, the to-be-tested gas path exhaust regulating valve 1240 and the carrier gas exhaust regulating valve 1040 are turned on at the same time to release the pressure synchronously and gradually according to a pressure value, so as to protect the components in the bottle-mouth package permeability test system. After the pressure reaches the set value, the pressure unloading step ends, and the program proceeds to the temperature unloading substep.

When the temperature unloading substep is performed, the carrier gas exhaust regulating valve 1040 and the to-be-tested gas path exhaust regulating valve 1240 are both turned on, and the flow rates of the carrier gas path and the to-be-tested gas path are maintained to the set values through regulation by the first regulating valve 330 and the second regulating valve 430. After the temperature reaches the set value, the temperature unloading step ends, and the program proceeds to the standby substep.

After the detection is completed and long-time placement is required, and after the temperature unloading substep runs and the set temperature is reached, the carrier gas can be selected to replace the to-be-tested gas path to protect the structural parts from oxidation and prolong the life of the instrument.

When the standby substep is performed, the components in the bottle-mouth package permeability test system stop operating, and the valves remain off.

The technical features in the above embodiments may be randomly combined. For concise description, not all possible combinations of the technical features in the above embodiments are described. However, all the combinations of the technical features are to be considered as falling within the scope described in this specification provided that they do not conflict with each other.

The above embodiments only describe several implementations of the present disclosure, and their description is specific and detailed, but cannot therefore be understood as a limitation on the patent scope of the present disclosure. It should be noted that those of ordinary skill in the art may further make variations and improvements without departing from the conception of the present disclosure, and these all fall within the protection scope of the present disclosure. Therefore, the patent protection scope of the present disclosure should be subject to the appended claims.

What is claimed is:

1. A bottle-mouth package permeability test system, comprising:
   a permeation amplifying cavity (200), a bottle-mouth mold group (100) being sealed and mounted in the permeation amplifying cavity (200), wherein the bottle-mouth mold group (100) comprises a plurality of bottle-mouth molds (101) connected in series;
   a carrier gas assembly connected to the bottle-mouth mold group (100);
   a to-be-tested gas assembly connected to the permeation amplifying cavity (200), an intake end of the to-be-tested gas assembly being arranged adjacent to an exhaust end of the carrier gas assembly, and an exhaust end of the to-be-tested gas assembly being arranged adjacent to an intake end of the carrier gas assembly;

a pressure regulating assembly configured to regulate pressure states of a carrier gas outputted by the carrier gas assembly and a to-be-tested gas outputted by the to-be-tested gas assembly;

a temperature regulating assembly configured to regulate temperature states of the carrier gas outputted by the carrier gas assembly and the to-be-tested gas outputted by the to-be-tested gas assembly; and a detection assembly (500) in communication with the exhaust end of the carrier gas assembly.

2. The bottle-mouth package permeability test system according to claim 1, further comprising:

a purification device (600) mounted between the carrier gas assembly and the bottle-mouth mold group (100).

3. The bottle-mouth package permeability test system according to claim 1, further comprising:

a protection cavity (710) covering the permeation amplifying cavity (200), gas pressure in the permeation amplifying cavity (200), gas pressure in the protection cavity (710), and atmospheric pressure being configured in a sequentially decreasing gradient;

a protection cavity intake passage (720) and a protection cavity exhaust passage (730) that are in communication with the protection cavity (710), respectively;

a protection cavity regulating valve (740) mounted on the protection cavity intake passage (720) and the protection cavity exhaust passage (730), respectively;

a protection cavity first sensing member (750) configured to acquire gas pressure in the protection cavity (710), the protection cavity first sensing member (750) being mounted on the protection cavity exhaust passage (730); and a protection cavity second sensing member (760) configured to acquire a gas temperature in the protection cavity (710), the protection cavity second sensing member (760) being mounted in the protection cavity (710).

4. The bottle-mouth package permeability test system according to claim 3, further comprising:

a protection cavity heater (770) and a protection cavity refrigerator (780) that are mounted in the protection cavity (710).

5. The bottle-mouth package permeability test system according to claim 1, further comprising:

a drying device (800) configured to dry the carrier gas fed into the bottle-mouth mold group (100) and the to-be-tested gas fed into the permeation amplifying cavity (200), respectively.

6. The bottle-mouth package permeability test system according to any claim 1, wherein the carrier gas assembly comprises:

a carrier gas intake passage (310), a first end of the carrier gas intake passage (310) being configured to feed the carrier gas, and a second end of the carrier gas intake passage (310) being connected to an intake end of the bottle-mouth mold group (100);

a carrier gas exhaust passage (320), a first end of the carrier gas exhaust passage (320) being connected to an exhaust end of the bottle-mouth mold group (100), and a second end of the carrier gas exhaust passage (320) being connected to the detection assembly (500);

a first regulating valve (330) mounted on the carrier gas intake passage (310) and the carrier gas exhaust passage (320), respectively; and a first pressure-relief valve (340) mounted on the carrier gas intake passage (310).

7. The bottle-mouth package permeability test system according to claim 6, wherein the to-be-tested gas assembly comprises:

a to-be-tested gas intake passage (410), a first end of the to-be-tested gas intake passage (410) being configured to feed the to-be-tested gas, and a second end of the to-be-tested gas intake passage (410) being connected to an intake port of the permeation amplifying cavity (200), wherein the intake port is arranged at a position in the permeation amplifying cavity (200) adjacent to an exhaust end of the carrier gas assembly;

a to-be-tested gas exhaust passage (420) connected to an exhaust port of the permeation amplifying cavity (200), wherein the exhaust port is arranged at a position in the permeation amplifying cavity (200) adjacent to an intake end of the carrier gas assembly;

a second regulating valve (430) mounted on the to-be-tested gas intake passage (410); and a second pressure-relief valve (440) mounted on the to-be-tested gas intake passage (410).

8. The bottle-mouth package permeability test system according to claim 7, wherein the pressure regulating assembly comprises:

a carrier gas path exhaust valve (910) mounted on the carrier gas intake passage (310);

a carrier gas path first sensing member (920) configured to acquire gas pressures in the carrier gas intake passage (310) and the carrier gas exhaust passage (320);

a to-be-tested gas path exhaust valve (930) mounted on the to-be-tested gas intake passage (410); and a to-be-tested gas path first sensing member (940) configured to acquire gas pressures in the to-be-tested gas intake passage (410) and the to-be-tested gas exhaust passage (420).

9. The bottle-mouth package permeability test system according to claim 7, wherein the temperature regulating assembly comprises:

a heat exchange assembly configured to heat the carrier gas fed into the bottle-mouth mold group (100) and the to-be-tested gas fed into the permeation amplifying cavity (200) and to refrigerate the carrier gas discharged from the bottle-mouth mold group (100); or the heat exchange assembly being configured to refrigerate the carrier gas fed into the bottle-mouth mold group (100) and the to-be-tested gas fed into the permeation amplifying cavity (200) and to heat the carrier gas discharged from the bottle-mouth mold group (100);

a carrier gas path second sensing member (1020) configured to acquire gas temperatures in the carrier gas intake passage (310) and the carrier gas exhaust passage (320); and a to-be-tested gas path second sensing member (1030) configured to acquire temperatures in the to-be-tested gas intake passage (410) and the to-be-tested gas exhaust passage (420).

10. The bottle-mouth package permeability test system according to claim 9, wherein the heat exchange assembly comprises:

a first heat exchanger (1011) mounted on the carrier gas intake passage (310);

a second heat exchanger (1012) mounted on the carrier gas exhaust passage (320); and a third heat exchanger (1013) mounted on the to-be-tested gas intake passage (410);

when the first heat exchanger (1011) is configured to heat the carrier gas fed into the bottle-mouth mold group (100), the second heat exchanger (1012) is configured to refrigerate the carrier gas discharged from the bottle-mouth mold group (100); or when the first heat exchanger (1011) is configured to refrigerate the carrier gas fed into the bottle-mouth mold group (100), the second heat exchanger (1012) is configured to heat the carrier gas discharged from the bottle-mouth mold group (100).

\* \* \* \* \*